(12) United States Patent
Kim et al.

(10) Patent No.: US 9,269,018 B2
(45) Date of Patent: Feb. 23, 2016

(54) STEREO IMAGE PROCESSING USING CONTOURS

(71) Applicant: Microsoft Corporation, Redmond, WA (US)

(72) Inventors: David Kim, Cambridge (GB); Shahram Izadi, Cambridge (GB); Christoph Rhemann, Cambridge (GB); Christopher Zach, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/154,825

(22) Filed: Jan. 14, 2014

(65) Prior Publication Data
US 2015/0199588 A1    Jul. 16, 2015

(51) Int. Cl.
*G06K 9/48*    (2006.01)
*G06K 9/46*    (2006.01)
*G06T 7/00*    (2006.01)

(52) U.S. Cl.
CPC ............ *G06K 9/4638* (2013.01); *G06T 7/0075* (2013.01)

(58) Field of Classification Search
CPC ............... G06K 9/4638; G06T 7/0075; G06T 2207/10012; G06T 7/0022; H04N 13/0239; H04N 2013/0081
USPC ......... 382/100, 154, 106, 103, 181, 190, 195, 382/199, 141, 285, 276, 293, 294, 173, 209
See application file for complete search history.

(56) References Cited

U.S. PATENT DOCUMENTS

| | | | |
|---|---|---|---|
| 5,566,246 A | 10/1996 | Rao | |
| 6,256,036 B1* | 7/2001 | Matsumoto | 345/419 |
| 7,164,784 B2* | 1/2007 | Beardsley | 382/154 |
| 2010/0111370 A1* | 5/2010 | Black et al. | 382/111 |
| 2011/0069887 A1 | 3/2011 | Bendahan et al. | |
| 2013/0163883 A1* | 6/2013 | Takemoto | 382/199 |

OTHER PUBLICATIONS

McCane, et al.,"A Stereo Matching Algorithm using Curve Segments and Cluster Analysis", In Technical Report 94/5, Dept. Computer Science, James Cook University, Jul. 23, 1994, 26 pages.*
Liu, et al., "A Novel Algorithm of Gait Recognition", In the International Conference on Wireless Communications & Signal Processing, Nov. 13, 2009, 5 pages.
Hayashi, et al., "Occlusion Detection of Real Objects Using Contour Based Stereo Matching", In Proceedings of the International Conference on Augmented Tele-Existence, Dec. 5, 2005, 7 pages.
(Continued)

*Primary Examiner* — Sheela C Chawan
(74) *Attorney, Agent, or Firm* — Steve Wight; Judy Yee; Micky Minhas

(57) ABSTRACT

A computer-implemented stereo image processing method which uses contours is described. In an embodiment, contours are extracted from two silhouette images captured at substantially the same time by a stereo camera of at least part of an object in a scene. Stereo correspondences between contour points on corresponding scanlines in the two contour images (one corresponding to each silhouette image in the stereo pair) are calculated on the basis of contour point comparison metrics, such as the compatibility of the normal of the contours and/or a distance along the scanline between the point and a centroid of the contour. A corresponding system is also described.

20 Claims, 7 Drawing Sheets

(56) References Cited

OTHER PUBLICATIONS

Li, et al., "Action Recognition Based on A Bag of 3D Points", In IEEE Computer Society Conference on Computer Vision and Pattern Recognition Workshops, Jun. 13, 2010, 6 pages.

Sherman, et al., "Stereo by Incremental Matching of Contours", In IEEE Transactions on Pattern Analysis and Machine Intelligence, vol. 12, Issue 11, Nov. 1990, 5 pages.

Hertzmann, Aaron, "Introduction to 3D Non-Photorealistic Rendering: Silhouettes and Outlines", In ACM Siggraph Course Notes Course on Non-Photorelistic Rendering, Aug. 9, 1999, 14 pages.

Morimoto, et al., "An Object Detection and Extraction Method Using Stereo Camera", In World Automation Congress, Sep. 28, 2008, 6 pages.

Izadi, et al., "C-Slate: A Multi-Touch and Object Recognition System for Remote Collaboration using Horizontal Surfaces", In Proceedings of the Second Annual IEEE International Workshop on Horizontal Interactive Human-Computer Systems (Tabletop), Oct. 2007, 8 pages.

"International Search Report and Written Opinion Issued in PCT Patent Application No. PCT/US2015/010542", Mailed Date: Mar. 25, 2015, 11 Pages.

"Second Written Opinion Issued in PCT Application No. PCT/US2015/010542", Mailed Date: Jul. 17, 2015, 5 Pages.

Tefera, et al., "Tailor Made Dynamic Programming for Edge Matching", In Proceedings of the Computer Graphics International, Jun. 22, 1998, pp. 700-705.

Baker, et al., "Depth From Edge and Intensity Based Stereo", In Proceedings of the International Joint Conference on Artificial Intelligence, Jan. 1, 1981, pp. 631-636.

Ohta, et al., "Stereo by Intra- and Inter-Scanline Search Using Dynamic Programming", In IEEE Transactions on Pattern Analysis and Machine Intelligence, vol. 30, Issue 2, Mar. 1, 1985, pp. 139-154.

"International Preliminary Report on Patentability Issued in PCT Application No. PCT/US2015/010542", Mailed Date: Dec. 3, 2015, 8 Pages.

* cited by examiner

STEREO IMAGE PROCESSING USING CONTOURS

BACKGROUND

Natural user interfaces (NUI) have captured the imagination of many, as they shift the paradigm of human-computer interaction away from the traditional mouse and keyboard, towards more expressive input modalities. Whilst the term is broad and can encompass touch, gesture, gaze, voice, and tangible input, NUI often implies leveraging the dexterity that the higher degrees-of-freedom (DoF) of our hands allow for interaction.

With the advent of consumer depth cameras, many new systems for in-air interactions coupled with surface-based interactions have appeared. Depth cameras estimate depth by projecting dynamic patterns onto a scene and capturing images of the projected patterns with a stereo camera. Using pattern recognition, the camera system is able to estimate depth based on discrepancies between the positions of recognized patterns in each pair of left and right input images captured by the stereo camera.

To obtain such discrepancies, the camera system uses stereo image processing or stereo-matching algorithms to identify corresponding points in each pair of input images (left and right) captured by the stereo camera, where the points in the two input images are projections from the same scene point.

Stereo matching algorithms, along with the subsequent computation of depth, may incur significant computational cost. Furthermore, to deal with movement, patterns need to be projected and imaged at high frame rates, which involves expensive hardware.

Researchers continue to look for new ways of reducing computational and procurement costs, whilst retaining or increasing precision.

The examples described below are not limited to implementations which solve any or all of the disadvantages of known natural user interface (NUI) technologies.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A computer-implemented stereo image processing method which uses contours is described. In an embodiment, contours are extracted from two silhouette images captured at substantially the same time by a stereo camera of at least part of an object in a scene. Stereo correspondences between contour points on corresponding scanlines in the two contour images (one corresponding to each silhouette image in the stereo pair) are calculated on the basis of contour point comparison metrics, such as the compatibility of the normal of the contours and/or a distance along the scanline between the point and a centroid of the contour. A corresponding system is also described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In an exemplary NUI setup involving stereo image processing, a stereo camera and illumination source are placed in relation to a retro-reflective surface so as to define an interaction volume, in which a user may provide input using hand gestures. When triggered, the stereo camera is shuttered and the illumination source pulsed simultaneously during the camera exposure. The illumination causes a bright uniform response from the retro-reflective surface, such that the surface is readily distinguishable as a bright silhouette. When objects interact on or above these surfaces, a sharp contrast is created between the surface and the object. A contour may be extracted from the silhouette, and stereo matching performed in the manner described herein. The stereo matching algorithm estimates the 3D depth of the contour of the object.

Although the present examples are described and illustrated herein as being implemented in a computing-based device, the system described is provided as an example and not a limitation. As those skilled in the art will appreciate, the present examples are suitable for application in a variety of different types of computing-based systems.

Figure 1:
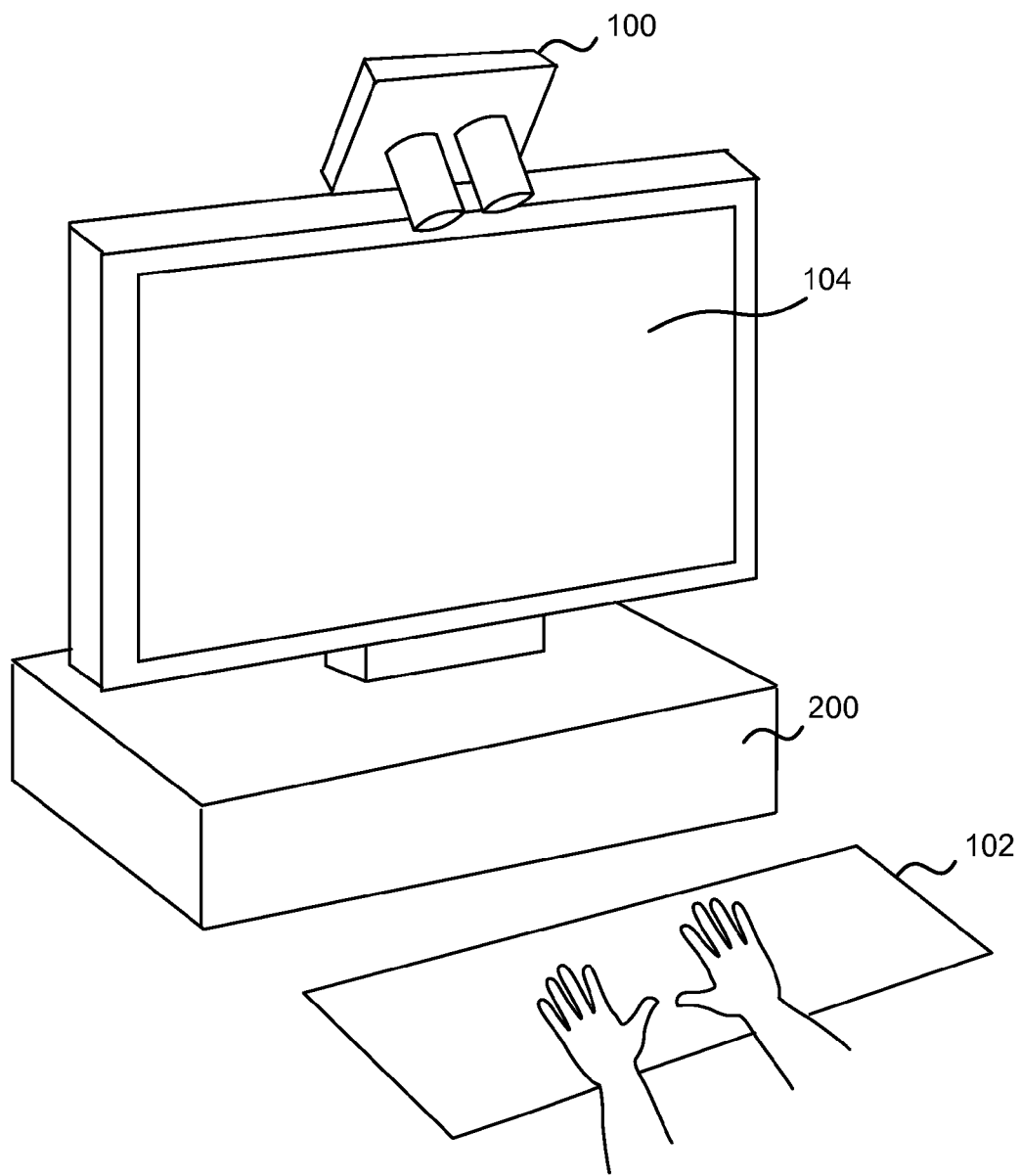
FIG. 1 illustrates a scenario involving an exemplary computing-based device in which examples of a stereo image processing system and method may be implemented.

FIG. 1 illustrates a scenario involving an exemplary computing-based device 200 which may be implemented as any form of a computing and/or electronic device, and in which examples of a stereo image processing system and method may be implemented.

The computing-based device 200 is in communication with a stereo camera 100 with an illumination source (not shown) and a display device 104. A retro-reflective surface 102 lies in front of the computing-based device 200, which in conjunction with the stereo camera 100 defines a volume of space in which the user is able to provide input to the computing-based device 200 using hand gestures. The retro-reflective surface 102 and stereo camera 100 may be positioned in any such relationship that an interaction volume is defined whilst the retro-reflective surface reflects illumination back to the stereo camera 100 so as to produce a high-contrast or silhouette image.

Figure 2:
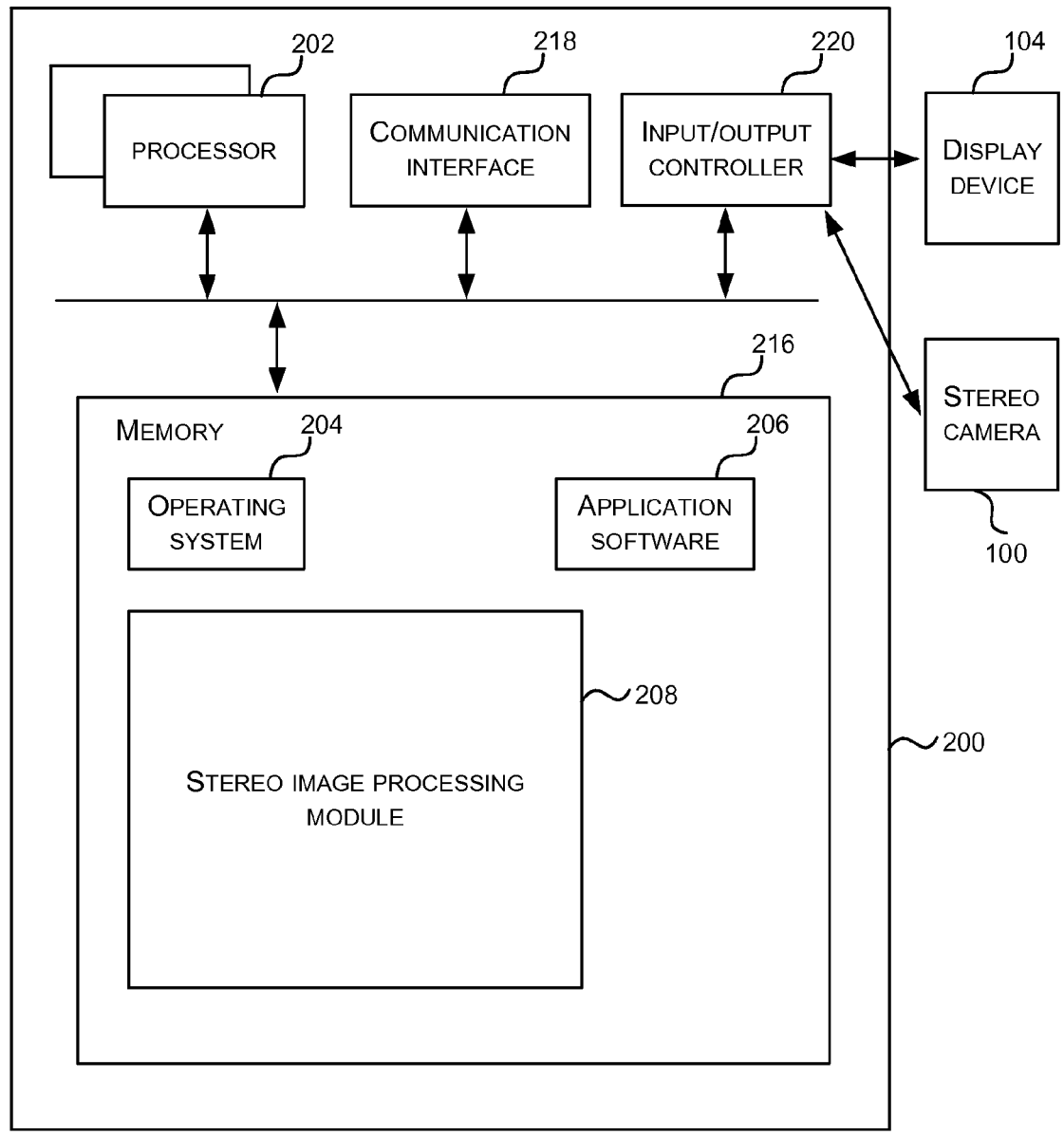
FIG. 2 is a schematic diagram illustrating the computing-based device of FIG. 1 comprising an example of a stereo image processing system.

As shown in FIG. 2, the computing-based device 200 comprises one or more processors 202 which may be microprocessors, controllers or any other suitable type of processors for processing computer-executable instructions. In some examples, for example where a system on a chip architecture is used, the processors 202 may include one or more fixed function blocks (also referred to as accelerators) which implement a part of a stereo image processing method in hardware (rather than software or firmware). Platform software comprising an operating system 204 or any other suitable platform software may be provided at the computing-based device 200 to enable application software 206 and a stereo image processing module 208 to be executed.

The computer executable instructions may be provided using any computer-readable media that is accessible by computing based device 200. Computer-readable media may include, for example, computer storage media such as memory 216 and communications media. Computer storage media, such as memory 216, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 216) is shown within the computing-based device 200 it will be appreciated that the storage may be distributed or located remotely and accessed via a network or other communication link (e.g. using communication interface 218).

The computing-based device 200 also comprises an input/output controller 220 arranged to output display information to the display device 104 which may be separate from or integral to the computing-based device 200. The display information may provide a graphical user interface. The input/output controller 220 is also arranged to receive and process input from one or more devices, such as stereo camera 100, and in various examples also from e.g. a mouse, keyboard, camera, microphone or other sensor (not shown). In some examples the user input devices may detect voice input, user gestures or other user actions and may provide a natural user interface (NUI). In an example the display device 104 may also act as a user input device if it is a touch sensitive display device. The input/output controller 220 may also output data to devices other than the display device 104, e.g. a locally connected printing device (not shown in FIG. 2).

Any of the input/output controller 220, display device 104 and the stereo camera 100 or other input devices may comprise NUI technology including but not limited to those relying on voice and/or speech recognition, touch and/or stylus recognition (touch sensitive displays), head and eye tracking, voice and speech, vision, touch, machine intelligence, intention and goal understanding systems, motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 3:
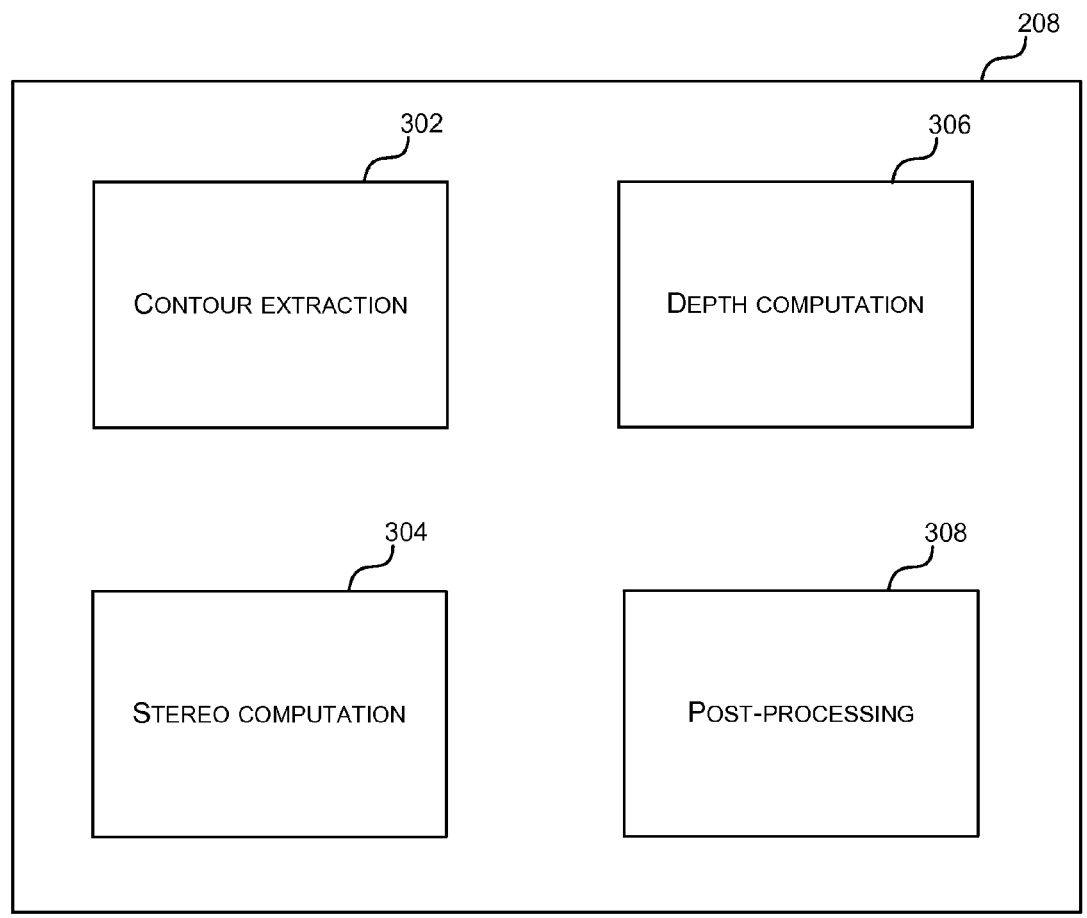
FIG. 3 is a schematic diagram illustrating part of the example of the stereo image processing system of FIG. 2 in greater detail.

FIG. 3 is a schematic diagram illustrating the stereo image processing module 208 of FIG. 2 in greater detail. This module may be implemented in software, hardware or any combination thereof. The stereo image processing module 208 comprises a contour extraction module 302, a stereo computation module 304, a depth computation module 306, and a post-processing module 308.

The inventors have recognized that, by restricting the application of stereo image processing to sparse contours, the computational cost can be greatly reduced, whilst increasing precision of disparity estimation.

The contour extraction module 302 performs a contour extraction process on first and second input images, captured by the stereo camera 100 at substantially the same time, of at least part of an object in a scene, to produce respective first and second pluralities of contour points, each defining a contour K, K' of the at least part of the object. The term "contour" is used herein to refer to a number of connected components collectively defining an outer surface of an object.

Figure 7:
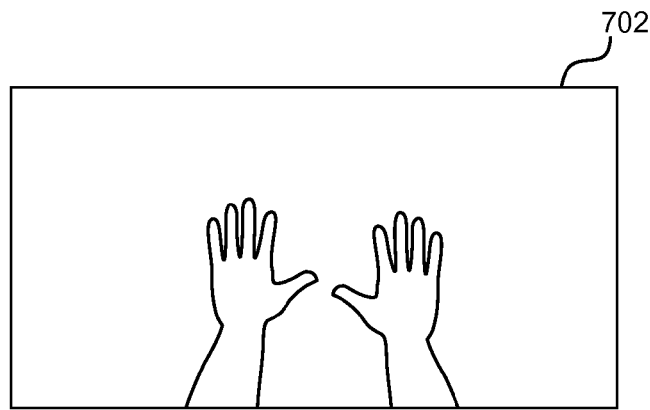
FIG. 7 illustrates an input image being processed by a contour extraction module to produce a contour image.
Figure 7:
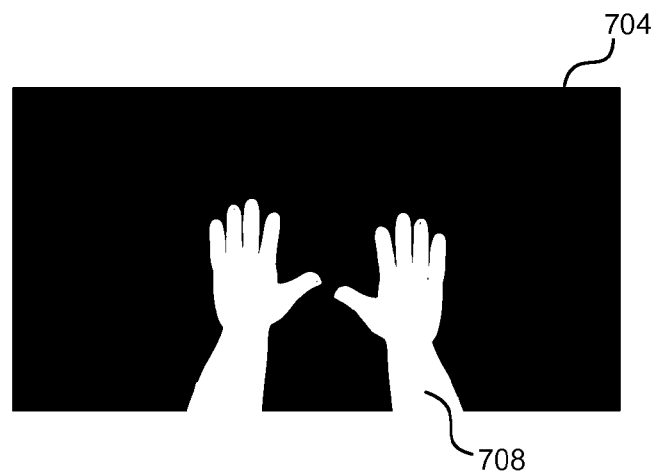
Figure 7:
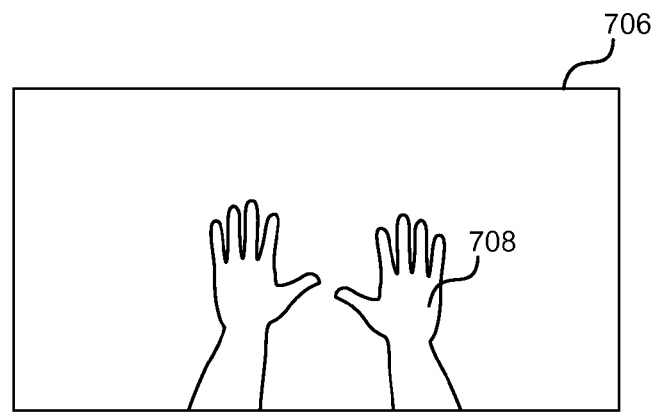

In one example, as illustrated in FIG. 7, the contour extraction module 302 applies a threshold to an input image 702 to produce a silhouette image 704, which may be a high-contrast or binary image. The contour extraction module 302 identifies transitions between contrasting regions in the silhouette image 704 (e.g. using thresholding) to produce the first and second pluralities of contour points, which may be represented by a contour image 706. The object being imaged in this case comprises a user's hands 708. The first and second pluralities of contour points may be stored as lists of contour points, for example sorted (or ordered) lists for rapid searching. In one example, the input image 702, particularly when produced by the stereo camera 100 in conjunction with the illumination source and retro-reflective surface 102, may be of sufficiently high contrast that it serves as the silhouette image 704, so that no thresholding is performed.

Performing the contour extraction process may comprise computing a convex hull of at least the object in the image to extract the contour points defining the contour K, K'. The output of the contour extraction module 302 may comprise a 1D closed contour line (e.g. a 1D vector of 2D image points), or contour image, for each of the pair of input images, which will ultimately provide a depth for every contour point.

The stereo computation module 304 is configured to calculate stereo correspondences between contour points on corresponding scanlines in the first and second contour images on the basis of contour point comparison metrics.

The stereo computation module 304 uses a stereo algorithm to identify corresponding points in pairs of contour images that are projections from the same scene point. The contour images may be rectified, such that corresponding points are known to lie on the same horizontal scanline in the left and right contour images, which reduces the depth estimation to a 1D search task. The horizontal displacement between corresponding points is known as disparity and is inversely proportional to depth. The stereo computation module 304 determines the correspondences between contour points that lie on a particular scanline S.

Figure 4:
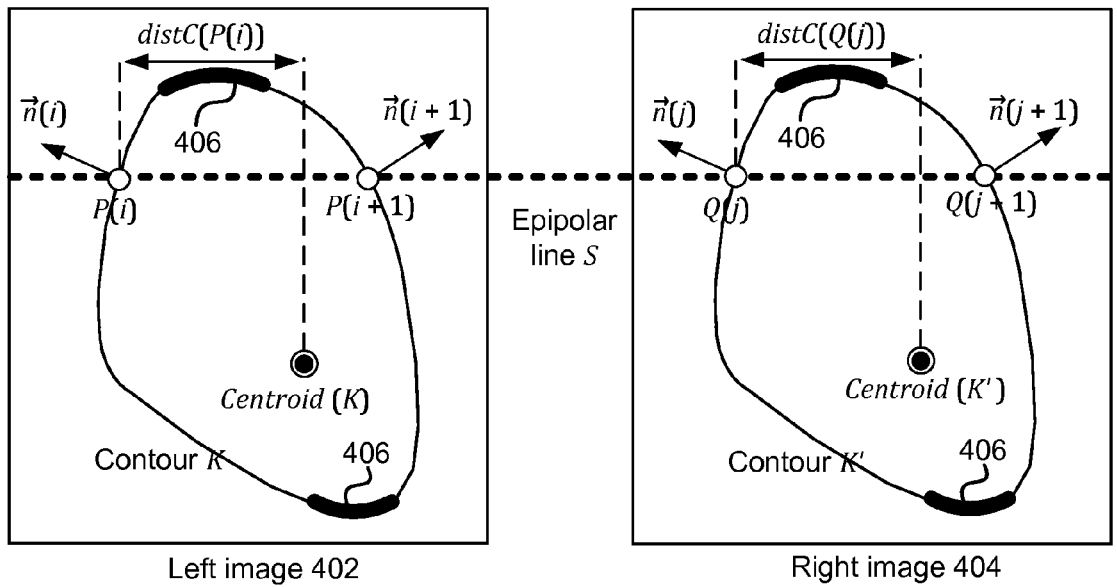
FIG. 4 illustrates left and right images captured by a stereo camera being processed according to an example of a stereo image processing method.

FIG. 4 illustrates rectified left and right contour images output by the contour extraction module 302 being processed by the stereo computation module 304. The left (first) contour image 402 shows a contour K of an object having a centroid "Centroid(K)", and the right (second) contour image 404 shows a contour K' of the same object again having a centroid "Centroid (K')". The two contour images 402, 404 are scanned line by line or in parallel, with one scanline S being illustrated in FIG. 4.

To calculate stereo correspondences, the stereo computation module 304, for each of a number of corresponding scanlines S in the first and second contour images 402, 404, identifies a first set of contour points P in the scanline S in the first contour image 402 and a second set of contour points Q in the scanline S in the second contour image 404. In the example shown in FIG. 4 there are two contour points P in the scanline S in the first contour image 402 and two contour points Q in the scanline S in the second contour image 404 and two lists may be stored for each scanline, with each list comprising those contour points in the scanline. In the illustrated example, for any one of the contour points in the first list (for scanline S) there are only two candidate contour points, which are the two points identified in the second list (for scanline S). In other examples, there may be more than two candidate contour points.

More specifically, where p and q are contour points in the left and right images 402, 404, respectively, P and Q are lists of length |P| and |Q| that store the image x-coordinate of those contour points lying on the scanline S in the left and right images 402, 404, respectively. P(i) denotes the ith element in the list P, Q(j) denotes the jth element in the list Q, and the lists P and Q may be sorted (or ordered).

In order to identify the corresponding contour points in the left and right images, the stereo computation module 304 obtains one or more comparison metrics for each contour point in the lists P and Q. In the example shown, the comparison metrics comprise a measure of direction of curvature of the contours K, K', that measure being in this example a unit normal vector $\vec{n}(i)$, $\vec{n}(i+1)$, $\vec{n}(j)$, $\vec{n}(j+1)$ representing each contour point. Optionally, the one or more comparison metrics may also comprise a centroid separation, comprising a distance, for example distC(P(i)), distC(Q(j)) as shown in FIG. 4, along the scanline S between each contour point and a centroid of the respective contour K, K' on which the contour point lies. Any other metric may be used instead or in addition, alone or in combination, so long as the metric may be used to identify corresponding points in the left and right images.

Figure 5:
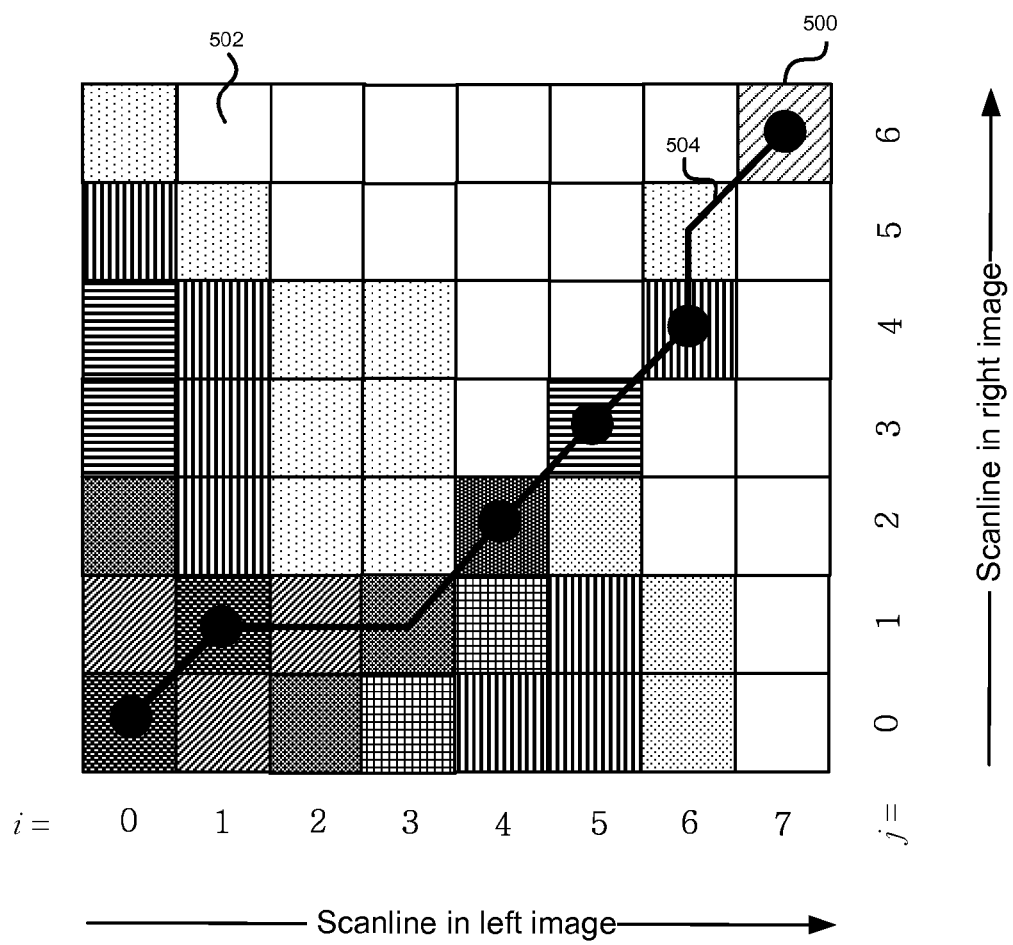
FIG. 5 illustrates further aspects of the example of the stereo image processing method of FIG. 5.

The stereo computation module 304 compares the one or more comparison metrics of each of the first set of contour points P in the first contour image 402 with the one or more comparison metrics of each of the second set of contour points Q in the second contour image 404 (the candidate points) to identify a best match from all the candidate points. This may be performed by producing a cost matrix 500, as illustrated in FIG. 5. Comparing comparison metrics may comprise calculating, for each pair of contour points in the cost matrix 500, a magnitude of the resultant vector obtained by subtracting the unit normal vector for one of the pair of contour points from the unit normal vector for the other of the pair of contour points. Comparing comparison metrics may further comprise calculating, for each pair of contour points in the cost matrix, a magnitude of the difference between the centroid separation for one of the pair of contour points and the centroid separation for the other of the pair of contour points. The stereo computation module 304 then computes a minimum-cost path 504 through the cost matrix 500 to calculate the stereo correspondences between the first set of contour points and the second set of contour points.

As shown in FIG. 5, each cell 502 indicates the accumulated costs at C(i; j). The minimum-cost path 504 is indicated, with matching pixels being marked by a circle, and those pixels along the path 504 which are not marked by a circle being occluded in the left or right image.

In more detail, the accumulated cost of a path is defined recursively (for i>0 and j>0) as:

$$C(i, j) = \min \begin{cases} C(i-1, j-1) + C_{match}(i, j) + C_{smooth}(i, j) \\ C(i-1, j) + \lambda_{occlusion} \\ C(i, j-1) + \lambda_{occlusion} \end{cases} \quad (1)$$

where the three different cases correspond to the three permitted moves discussed above. The boundary conditions are:

$C(0,0)=C_{match}(0,0)$
$C(i,0)=i \cdot \lambda_{occlusion}$ i>0
$C(0,j)=j \cdot \lambda_{occlusion}$ j>0

In Equation 1, $\lambda_{occlusion}$ is a constant occlusion penalty and the remaining terms are defined as follows.

The data term $C_{match}$ measures the compatibility of putatively matching contour points:

$$C_{match}(i,j) = \|\vec{n}(i) - \vec{n}(i)\| + |\text{dist}(P((i)) - \text{dist}C(Q(j))| \quad (2)$$

Here, the first part measures the Euclidean distance of the normal vectors $\vec{n}(i)$ and $\vec{n}(j)$ at contour points indexed by P(i) and Q(j) respectively. The second part compares the horizontal distance of point P (i) and Q (j) to the centroid of their corresponding contours K and K', respectively: distC(P(i)=P(i)−Centroid(K).

Producing the cost matrix (500) may comprise using a smoothing term to adjust the cost for each pair of contour points (P; Q) in the cost matrix, the smoothing term being the difference between the separation of one of the contour points in the pair from its closest neighboring contour point and the separation of the other of the contour points in the pair from its closest neighboring contour point. In the example above, the pairwise term $E_{smooth}$ encourages solutions where the horizontal distance between two neighboring matching points P(i) and P(ϕ(i)) is similar to the distance of their matching points Q(j) and Q(l):

$$E_{smooth}(i,j) = \|P(i) - P(\phi(i)) - (Q(j) - Q(\phi)(j)))\|, \quad (3)$$

where function ϕ( ) returns the closest previous matching point for the current path.

To find correspondences between the points in P and Q, the minimum-cost path through the cost matrix 500 is computed, as illustrated in FIG. 5. The cost matrix 500 is of size |P|×|Q| and each cell 502 stores C(i, j), the minimum accumulated cost of an optimal path from (0, 0) to (i, j). The minimum-cost path 504 is indicated in FIG. 5. The path may start at cell (0; 0) and end at cell (|P|,|Q|), so that a mapping for all contour points may be used. Three exemplary moves may be used to construct a path: a diagonal 45° move that indicates a match, as well as horizontal and vertical moves that represent points that are only visible in the left or right image, respectively.

The restrictions imposed on the path may involve the properties of uniqueness, since every contour point in P can only match to one point in Q and vice versa, and ordering, since if point P(i) matches Q(j) then P(i+1) can only match to Q(j+Δ) where Δ>0.

A box constraint may be imposed, to improve robustness. The box constraint may require that a dimension of a first bounding box of a first contour K in the first contour image 402 must not exceed by more than a predetermined amount a corresponding dimension of a second bounding box of a second contour K' in the second contour image 404. More particularly, where K is the contour that P(i) belongs to and K' is the contour that Q(j) belongs to, then if P(i) matches Q(j) the height of the bounding boxes of K and K' must not differ by more than a predetermined number of pixels, in one example 50 pixels.

Thus, one example uses dynamic-programming to find the path of minimal cost through the matrix 500. The optimization may consist of two consecutive steps. First, the cumulative costs C(i; j) are computed recursively for every pair (i; j) as per Equation 1. At each recursion the best "move" (i.e. the arg min of Eq. 1) is stored at (i; j) in a matrix M that has the same dimensions as the matrix 500. In the second step, the best path is reconstructed by tracing back the best moves stored in M starting from (|P|,|Q|) until the origin (0, 0) of M is reached. Once the best path is computed, the disparity d(i) (with respect to the left image) can be derived as d(i)=P(i)−Q(j) for matching points P(i) and P(j).

The depth computation module 306 computes depth using the calculated disparities between the first plurality of contour points and the second plurality of contour points to obtain a depth map. The relationship between disparity and depth is determined based on the known relative positions of the cameras which captured each of the two images.

The post-processing module 308 filters out wrong matches and assigns all points along the contour to a depth value. Although the estimated disparity map is usually of high quality, there might be outliers and contour points where no depth could be estimated (e.g. due to occlusion of this point in the other image).

The post-processing module 308 may invalidate contour points having a normal vector defining an angle with respect to the scanline S that is more than a predetermined amount. The depth estimation can be unreliable at contour points whose normal is almost perpendicular to the scanlines, as indicated by the regions 406 marked in FIG. 5. This is because the term $C_{match}$ is ambiguous in those regions. In one example, contour points whose normal vector has an angle of ≥85° are invalidated.

The post-processing module 308 may invalidate contour points which lie in separate, adjacent scanlines S along a contour in the depth map and whose depth differs by more than a predetermined amount. The depth map obtained with dynamic programming may be computed independently for each scanline. As a consequence, the depth at neighboring contour points that lie across scanlines might be inconsistent. Thus, outlier points whose depth differs from those of the closest neighboring points along the contour, for example by more than 3 mm, may be invalidated.

The post-processing module 308 may smooth depth values along a contour in the depth map, for example by smoothing the depth values along the contour with a 1D mean filter of size 25 pixels. The filter can be implemented using a sliding window technique with two operations per contour pixel.

Finally, the post-processing module 308 may assign depth values to occluded contour points, invalidated contour points, or both. The depth value may be computed as a linear combination of the depth assigned to the closest valid contour points.

In general, the complexity of a pixelwise stereo matching algorithm can be characterized with O(WHD), where W and H are the width and height of the images, respectively, and D is the number of tested depth hypotheses. In many scenarios D=O(W), i.e. higher resolution images imply a larger set of depth hypothesis to be considered.

Restricting the computation of depth to pixels lying on the silhouette contours may result in a substantial reduction in the search range D, since only a small set of extracted contour pixels in both images can be potential matches.

Figure 6:
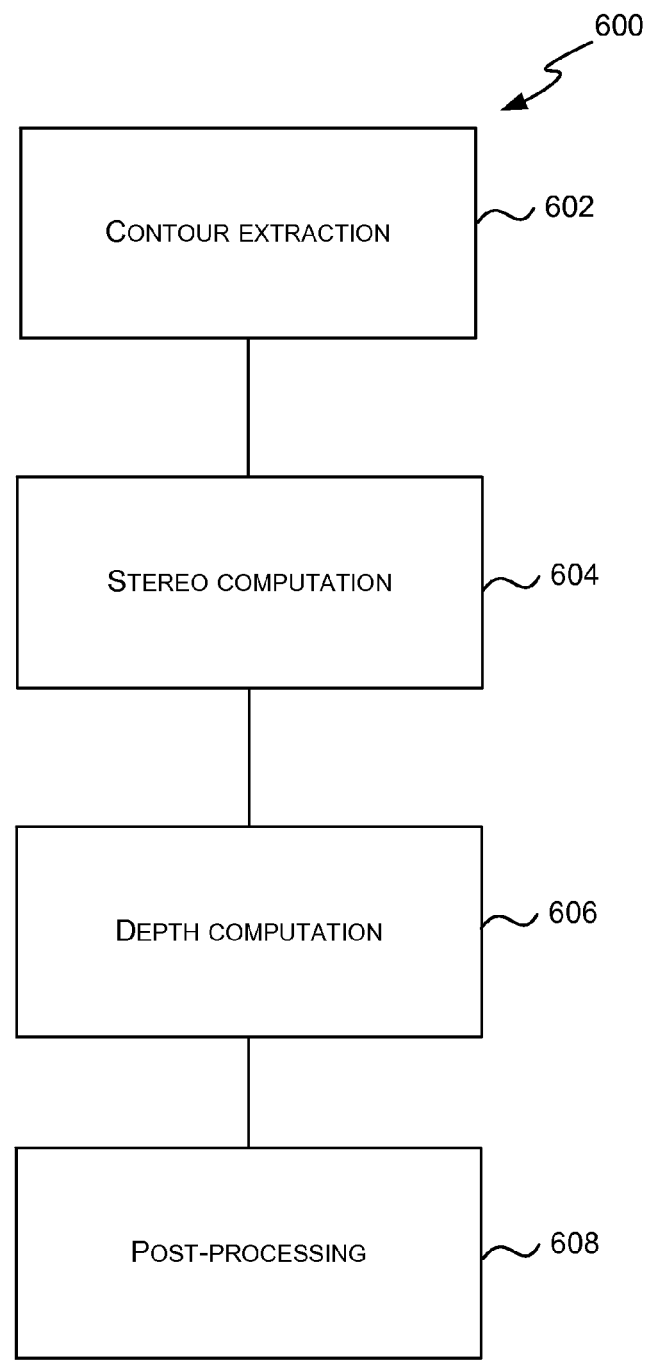
FIG. 6 is a flow diagram of the example of the stereo image processing method.

FIG. 6 is a flow diagram of the example of the stereo image processing method, including contour extraction 602, stereo computation 604, depth computation 606, and post-processing, as described above.

The system and method as described may provide a novel stereo-matching algorithm that efficiently extracts 3D points along object contours using dynamic programming The method described herein may be preceded by one or more of: 1) intrinsic calibration to compute the geometric parameters of each (IR) camera lens (focal length, principal point, radial and tangential distortion); 2) stereo calibration to compute the geometric relationship between the two camera lenses, expressed as a rotation matrix and translation vector; 3) stereo rectification to correct the camera image planes to ensure they are scanline-aligned to simplify disparity computation. At runtime, the synchronized input IR images are captured from both cameras simultaneously. Each image may be undistorted given intrinsic lens parameters, rectified to ensure that stereo matching can occur directly across scanlines of left and right images, and finally cropped to ignore non-overlapping parts.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary examples. Although various examples have been described above with a certain degree of particularity, or with reference to one or more individual examples, those skilled in the art could make numerous alterations to the disclosed examples without departing from the spirit or scope of this specification.

The invention claimed is:

1. A computer-implemented stereo image processing method comprising, at a processor:

performing a contour extraction process on first and second silhouette images, captured by a stereo camera, of at least part of an object in a scene, to produce respective first and second pluralities of contour points, each plurality of contour points defining a contour of the at least part of the object;

calculating stereo correspondences between contour points on corresponding scanlines in the first and second pluralities of contour points on the basis of contour point comparison metrics; and at least one of:

for each of a number of corresponding scanlines:
identifying a first set of contour points which lie in the scanline in the first plurality of contour points and a second set of contour points which lie in the scanline in the second plurality of contour points;
obtaining one or more comparison metrics for each contour point;
comparing the one or more comparison metrics of each of the first set of contour points with the one or more comparison metrics of each of the second set of contour points to produce a cost matrix; and
computing a minimum-cost path through the cost matrix to calculate the stereo correspondences between the first set of contour points and the second set of contour points; or for each of a number of corresponding scanlines:
identifying a first set of contour points which lie in the scanline in the first plurality of contour points and a second set of contour points which lie in the scanline in the second plurality of contour points;
obtaining one or more comparison metrics for each contour point;
comparing the one or more comparison metrics of each of the first set of contour points with the one or more comparison metrics of each of the second set of contour points to produce a cost matrix; and
computing a minimum-cost path through the cost matrix to calculate the stereo correspondences between the first set of contour points and the second set of contour points; and at least one of:
the one or more comparison metrics comprising a measure of direction of curvature of the contour; or
the one or more comparison metrics comprising a unit normal vector representing each contour point and comparing comparison metrics comprising calculating, for each pair of contour points in the cost matrix, a magnitude of the resultant vector obtained by subtracting the unit normal vector for one of the pair of contour points from the unit normal vector for the other of the pair of contour points; or
the one or more comparison metrics comprising a centroid separation, comprising a distance along the scanline between each contour point and a centroid of a contour on which the contour point lies, and comparing comparison metrics comprising calculating, for each pair of contour points in the cost matrix, a magnitude of the difference between the centroid separation for one of the pair of contour points and the centroid separation for the other of the pair of contour points; or
producing the cost matrix comprising using a smoothing term to adjust the cost for each pair of contour points in the cost matrix, the smoothing term being the difference between the separation of one of the contour points in the Pair from its closest neighboring contour point and the separation of the other of the contour points in the pair from its closest neighboring contour point; or obtaining a depth map based at least in part on the first and second pluralities of contour points and at least one of:

invalidating contour points which lie in separate, adjacent scanlines along a contour in the depth map and whose depth differs by more than a predetermined amount; or smoothing depth values along a contour in the depth map; or assigning depth values to occluded contour points, invalidated contour points, or both.

2. The method of claim 1, comprising receiving a stream of first and second input images at a frame rate, and calculating the stereo correspondences at least at the frame rate so that a 3D contour is output in real time.

3. The method of claim 1, comprising parallel processing of scanlines.

4. The method of claim 1, wherein performing the contour extraction process comprises computing a convex hull of the at least of the object to extract the pluralities of contour points defining the contour.

5. The method of claim 1, comprising storing each set of contour points in an ordered list during computation.

6. The method of claim 1, comprising storing contour points for each scanline in lists.

7. The method of claim 1, wherein calculating stereo correspondences further comprises, for each of a number of corresponding scanlines:

identifying a first set of contour points which lie in the scanline in the first plurality of contour points and a second set of contour points which lie in the scanline in the second plurality of contour points;

obtaining one or more comparison metrics for each contour point;

comparing the one or more comparison metrics of each of the first set of contour points with the one or more comparison metrics of each of the second set of contour points to produce a cost matrix; and computing a minimum-cost path through the cost matrix to calculate the stereo correspondences between the first set of contour points and the second set of contour points.

8. The method of claim 7, wherein the one or more comparison metrics comprise a measure of direction of curvature of the contour.

9. The method of claim 8, wherein the one or more comparison metrics comprise a unit normal vector representing each contour point, and wherein comparing comparison metrics comprises calculating, for each pair of contour points in the cost matrix, a magnitude of the resultant vector obtained by subtracting the unit normal vector for one of the pair of contour points from the unit normal vector for the other of the pair of contour points.

10. The method of claim 7, wherein the one or more comparison metrics comprise a centroid separation, comprising a distance along the scanline between each contour point and a centroid of a contour on which the contour point lies, and wherein comparing comparison metrics comprises calculating, for each pair of contour points in the cost matrix, a magnitude of the difference between the centroid separation for one of the pair of contour points and the centroid separation for the other of the pair of contour points.

11. The method of claim 7, wherein producing the cost matrix comprises using a smoothing term to adjust the cost for each pair of contour points in the cost matrix, the smoothing term being the difference between the separation of one of the contour points in the pair from its closest neighboring contour point and the separation of the other of the contour points in the pair from its closest neighboring contour point.

12. The method of claim 1, comprising imposing one or more constraints on the calculating of stereo correspondences, the one or more constraints comprising at least a box constraint requiring that a dimension of a first bounding box of a first contour defined by the first plurality of contour points must not exceed by more than a predetermined amount a corresponding dimension of a second bounding box of a second contour defined by the second plurality of contour points.

13. The method of claim 1, comprising invalidating contour points having a normal vector defining an angle with respect to the scanline that is more than a predetermined amount.

14. The method of claim 1, comprising computing depth using the calculated correspondences between the first plurality of contour points and the second plurality of contour points to obtain a depth map.

15. The method of claim 14, comprising invalidating contour points which lie in separate, adjacent scanlines along a contour in the depth map and whose depth differs by more than a predetermined amount.

16. The method of claim 14, comprising smoothing depth values along a contour in the depth map.

17. The method of claim 14, comprising assigning depth values to occluded contour points, invalidated contour points, or both.

18. A computer-implemented stereo image processing method comprising, at a processor:

performing a contour extraction process on first and second silhouette images, captured by a stereo camera, of at least part of an object in a scene, to produce respective first and second pluralities of contour points, each plurality of contour points defining a contour of the at least part of the object;

calculating stereo correspondences between contour points on corresponding scanlines in the first and second pluralities of contour points on the basis of contour point comparison metrics; and at least one of:

for each of a number of corresponding scanlines:

identifying a first set of contour points which lie in the scanline in the first plurality of contour points and a second set of contour points which lie in the scanline in the second plurality of contour points;

obtaining one or more comparison metrics for each contour point;

comparing the one or more comparison metrics of each of the first set of contour points with the one or more comparison metrics of each of the second set of contour points to produce a cost matrix; and computing a minimum-cost path through the cost matrix to calculate the stereo correspondences between the first set of contour points and the second set of contour points; or for each of a number of corresponding scanlines:

identifying a first set of contour points which lie in the scanline in the first plurality of contour points and a second set of contour points which lie in the scanline in the second plurality of contour points;

obtaining one or more comparison metrics for each contour point;

comparing the one or more comparison metrics of each of the first set of contour points with the one or more comparison metrics of each of the second set of contour points to produce a cost matrix; and computing a minimum-cost path through the cost matrix to calculate the stereo correspondences between the first set of contour points and the second set of contour points; and at least one of:

the one or more comparison metrics comprising a measure of direction of curvature of the contour; or the one or more comparison metrics comprising a unit normal vector representing each contour point and comparing comparison metrics comprising calculating, for each pair of contour points in the cost matrix, a magnitude of the resultant vector obtained by subtracting the unit normal vector for one of the pair of contour points from the unit normal vector for the other of the pair of contour points; or the one or more comparison metrics comprising a centroid separation, comprising a distance along the scanline between each contour point and a centroid of a contour on which the contour point lies, and comparing comparison metrics comprising calculating, for each pair of contour points in the cost matrix, a magnitude of the difference between the centroid separation for one of the pair of contour points and the centroid separation for the other of the pair of contour points; or producing the cost matrix comprising using a smoothing term to adjust the cost for each pair of contour points in the cost matrix, the smoothing term being the difference between the separation of one of the contour points in the pair from its closest neighboring contour point and the separation of the other of the contour points in the pair from its closest neighboring contour point; or obtaining a depth map based at least in part on the first and second pluralities of contour points and at least one of:

invalidating contour points which lie in separate, adjacent scanlines along a contour in the depth map and whose depth differs by more than a predetermined amount; or smoothing depth values along a contour in the depth map; or assigning depth values to occluded contour points, invalidated contour points, or both.

19. A stereo image processing system comprising:

a contour extraction module configured to extract contours from each of first and second silhouette images of at least part of an object in a scene, captured by a stereo camera, to produce respective first and second pluralities of contour points, each plurality of contour points defining a contour of the at least part of the object;

a stereo computation module configured to calculate stereo correspondences between contour points on corresponding scanlines in the first and second pluralities of contour points on the basis of contour point comparison metrics; and at least one of:

for each of a number of corresponding scanlines:

identifying a first set of contour points which lie in the scanline in the first plurality of contour points and a second set of contour points which lie in the scanline in the second plurality of contour points;

obtaining one or more comparison metrics for each contour point;

comparing the one or more comparison metrics of each of the first set of contour points with the one or more comparison metrics of each of the second set of contour points to produce a cost matrix; and computing a minimum-cost path through the cost matrix to calculate the stereo correspondences between the first set of contour points and the second set of contour points; or for each of a number of corresponding scanlines:

identifying a first set of contour points which lie in the scanline in the first plurality of contour points and a second set of contour points which lie in the scanline in the second plurality of contour points;

obtaining one or more comparison metrics for each contour point;

comparing the one or more comparison metrics of each of the first set of contour points with the one or more comparison metrics of each of the second set of contour points to produce a cost matrix; and computing a minimum-cost path through the cost matrix to calculate the stereo correspondences between the first set of contour points and the second set of contour points; and at least one of:

the one or more comparison metrics comprising a measure of direction of curvature of the contour; or the one or more comparison metrics comprising a unit normal vector representing each contour point and comparing comparison metrics comprising calculating, for each pair of contour points in the cost matrix, a magnitude of the resultant vector obtained by subtracting the unit normal vector for one of the pair of contour points from the unit normal vector for the other of the pair of contour points; or the one or more comparison metrics comprising a centroid separation, comprising a distance along the scanline between each contour point and a centroid of a contour on which the contour point lies, and comparing comparison metrics comprising calculating, for each pair of contour points in the cost matrix, a magnitude of the difference between the centroid separation for one of the pair of contour points and the centroid separation for the other of the pair of contour points; or producing the cost matrix comprising using a smoothing term to adjust the cost for each pair of contour points in the cost matrix, the smoothing term being the difference between the separation of one of the contour points in the pair from its closest neighboring contour point and the separation of the other of the contour points in the pair from its closest neighboring contour point; or obtaining a depth map based at least in part on the first and second pluralities of contour points and at least one of:

invalidating contour points which lie in separate, adjacent scanlines along a contour in the depth map and whose depth differs by more than a predetermined amount; or smoothing depth values along a contour in the depth map; or assigning depth values to occluded contour points, invalidated contour points, or both.

20. The system of claim 19, wherein the stereo computation module is configured to store each set of contour points in an ordered list during computation and to store contour points for each scanline in lists.

* * * * *